United States Patent

Noh

(10) Patent No.: US 8,018,499 B2
(45) Date of Patent: Sep. 13, 2011

(54) IMAGE PROCESSING METHOD AND DEVICE USING DIFFERENT CLOCK RATES FOR PREVIEW AND CAPTURE MODES

(75) Inventor: Yo-Hwan Noh, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 507 days.

(21) Appl. No.: 12/092,941

(22) PCT Filed: May 29, 2006

(86) PCT No.: PCT/KR2006/002055
§ 371 (c)(1),
(2), (4) Date: Sep. 22, 2008

(87) PCT Pub. No.: WO2007/055450
PCT Pub. Date: May 18, 2007

(65) Prior Publication Data
US 2009/0015701 A1      Jan. 15, 2009

(30) Foreign Application Priority Data

Nov. 11, 2005   (KR) ................. 10-2005-0108257

(51) Int. Cl.
*H04N 5/228* (2006.01)
(52) U.S. Cl. ............... 348/222.1; 348/234; 348/333.11; 348/333.13
(58) Field of Classification Search ............... 348/222.1
See application file for complete search history.

(56) References Cited

U.S. PATENT DOCUMENTS

| | | | | |
|---|---|---|---|---|
| 6,683,642 | B1 * | 1/2004 | Kobayashi et al. | 348/231.2 |
| 2001/0036359 | A1 * | 11/2001 | Nishikawa et al. | 386/109 |
| 2005/0057667 | A1 * | 3/2005 | Shimizu et al. | 348/231.99 |

FOREIGN PATENT DOCUMENTS

| | | |
|---|---|---|
| JP | 3-154487 A | 7/1991 |
| JP | 10-233947 A | 9/1998 |
| JP | 2000-032332 A | 1/2000 |
| JP | 2001-292347 A | 10/2001 |
| JP | 2003-338979 | * 11/2003 |

* cited by examiner

*Primary Examiner* — Sinh Tran
*Assistant Examiner* — Paul Berardesca
(74) *Attorney, Agent, or Firm* — Birch, Stewart, Kolasch & Birch, LLP

(57) ABSTRACT

An image processing method and a device thereof are disclosed. In an image signal processor of the present invention, a process clock rate or an output clock rate for a preview mode is applied differently from a process clock rate or an output clock rate for a capture mode. When performing the capture mode, however, the process clock rate can be controlled to be the same as or larger than the output clock rate. With the present invention, the lagging can be reduced during the image processing.

20 Claims, 18 Drawing Sheets

IMAGE PROCESSING METHOD AND DEVICE USING DIFFERENT CLOCK RATES FOR PREVIEW AND CAPTURE MODES

CROSS-REFERENCE TO RELATED APPLICATIONS

This application claims foreign priority benefits under 35 U.S.C. .sctn. 119(a)-(d) to PCT/KR2006/002055, filed May 29, 2006, which is hereby incorporated by reference in its entirety.

BACKGROUND

1. Technical Field

The present invention relates to image processing, more specifically to a method and a device that reduce delay of processing an image.

2. Description of the Related Art

By mounting a small or thin imaging device on a small or thin portable terminal, such as a portable phone or a PDA (personal digital assistant), the portable terminal can now function as an imaging device also. Thanks to this new development, the portable terminal can send not only audio information but also visual information. The imaging device has been also mounted on a portable terminal such as the MP3 player, besides the portable phone and PDA. As a result, a variety of portable terminals can now be embodied to capture an external image and retain the image as electric data.

Generally, the imaging device uses a solid state imaging device such as a CCD (charge-couple device) image sensor and a CMOS (complementary Metal-oxide semiconductor) image sensor.

FIG. 1 is a simplified structure of a typical imaging device, and FIG. 2 shows signal types for outputting encoded data. FIG. 3 shows the steps of a typical JPEG encoding process.

As shown in FIG. 1, the imaging device, converting the captured external image to electric data and displaying the image on a display unit 150, comprises an image sensor 110, an image signal processor (ISP) 120, a back-end chip 130, a baseband chip 140 and the display unit 150. The imaging device can further comprise a memory, for storing the converted electric data, and an AD converter, converting an analog signal to a digital signal.

The image sensor 110 has a Bayer pattern and outputs an electrical signal, corresponding to the amount of light inputted through a lens, per unit pixel.

The image signal processor 120 converts raw data inputted from the image sensor 110 to a YUV value and outputs the converted YUV value to the back-end chip 130. Based on the fact that the human eye reacts more sensitively to luminance than to chrominance, the YUV method divides a color into a Y component, which is luminance, and U and V components, which are chrominance. Since the Y component is more sensitive to errors, more bits are coded in the Y component than in the U and V components. A typical Y:U:V ratio is 4:2:2.

By sequentially storing the converted YUV in FIFO, the image signal processor 120 allows the back-end chip 130 to receive corresponding information.

The back-end chip 130 converts the inputted YUV value to JPEG or BMP through a predetermined encoding method and stores the YUV value in a memory, or decodes the encoded image, stored in the memory, to display on the display unit 150. The back-end chip 130 can also enlarge, reduce or rotate the image. Of course, it is possible, as shown in FIG. 1 that the baseband chip 140 also receives from the back-end chip 130, and display on the display unit, the decoded data.

The baseband chip 140 controls the general operation of the imaging device. For example, once a command to capture an image is received from a user through a key input unit (not shown), the baseband chip 140 can make the back-end chip 130 generate encoded data corresponding to the inputted external image by sending an image generation command to the back-end chip 130.

The display unit 150 displays the decoded data, provided by the control of the back-end chip 130 or the baseband chip 140.

Signal types during the steps of sequentially inputting the data, stored in the memory, to process, for example, decoding are shown in FIG. 2. Generally, the back-end chip 130 is realized to receive the YUV/Bayer-format data, and the P_CLK, V_sync, H_REF and DATA signals, are used as the interface for receiving this kind of data.

As shown in FIG. 2, since the conventional back-end chip 130 is designed to be inputted with a vertical synchronous signal (V_sync2) for a following frame (e.g. a $(k+1)^{th}$ frame) and/or image data while processing the encoding for one frame (e.g. a $k^{th}$ frame), there has been much possibility of causing an error during the image data encoding.

As a result, the conventional back-end chip 130 sometimes encodes not only the frame that is currently being processed but also the next frame, not completing the encoding of correct data.

Besides, when an encoding unit of the back-end chip 130 transfers encoded data to the decoding unit or stores the encoded data in the memory, the encoded data for the current frame is sometimes not inputted correctly after a new vertical synchronous signal (V_sync2) is received.

In addition, as shown in FIG. 2, the conventional image signal processor 120 alternately outputs the H_REF signal that may be used when the back-end chip 130 stores the data. This can cause power consumption due to switching of a write enable signal in the memory of the back-end chip 130.

FIG. 3 illustrates the steps of typical JPEG encoding, carried out by the back-end chip 130. Since the JPEG encoding process 200 is well-known to those of ordinary skill in the art, only a brief description will be provided here.

As illustrated in FIG. 2, the image of the inputted YUV values is divided into a block in the size of 8×8 pixels, and in a step represented by 210, DCT (discrete cosine transform) is performed for each block. DCT means a series of processes to perform Fourier transform by converting an image into a corresponding frequency in a space image.

Then, in a step represented by 220, a quantizer quantizes a DCT coefficient of each block by applying a weighted value according to the effect on the visual. A table of this weighted value is called a "quantization table." A quantization table value takes a small value near the DC and a high value at a high frequency, keeping the data loss low near the DC and compressing more data at a high frequency.

Then, in a step represented by 230, the final compressed data is generated by an entropy encoder, which is a lossless coder. The quantized coefficients consist of a series of successive zeros. Accordingly, the data can be decreased in size through a run-length encoding that represents data as a code symbol. Also, through a Huffman encoding, the data can be decreased in size. The Huffman algorithm assigns a shorter symbol to the code symbol that is statistically more frequently repeated. Both run-length and Huffman encodings do not cause data loss while performing the encoding to reduce the data size.

The data encoded through the above steps is stored in a memory. The back-end chip decodes the data loaded in the memory and displays the data on the display unit 150 for example.

The typical image signal processor 120 is realized to operate in a clock rate lower than a clock rate of the back-end chip 140.

Generally, image sensor 110 outputs raw data in a Bayer image format. The outputted raw data is converted into RGB data through a predetermined pre-process (e.g. an image process or interpolation). The RGB data is converted into YUV data for outputting. As a result, the amount of outputted data becomes about twice as much as the amount of inputted data. Accordingly, the clock rate used in an output part of the image processor 120 becomes approximately twice as much as the clock rate used for image processing inside of the image signal processor 120. Similarly, the clock rate in the back-end chip 130 shall become approximately twice as much as the clock rate used for the image processing inside the image signal processor 120.

As described above, since the output part of the image signal processor 120 uses a high clock rate, there have been errors during the image processing.

With the recent trend toward higher resolution, the image processing speed has become an important factor. For example, a clock frequency of about 20 to 40 MHz used to be sufficient to render a satisfactory image when processing a conventional VGA image or a one-mega-byte image. As today's images often have 3 to 5 mega bytes or more, however, clock frequencies of 60 to 80 MHz are now required to render 10 to 20 frames per second.

Considering the conventional linked structure between the image signal processor 120 and the back-end chip 130, increasing the clock rate for image processing of the image signal processor 120 requires an increased clock rate of the back-end chip 130, which is technologically impossible.

As such, since the conventional image signal processor 120 processes a high resolution image with a low frequency clock rate, it takes more time to capture a scene. Moreover, the scene is captured not at once but with delay. This lagged capturing of the image causes distortion of the captured image of a moving object.

Besides, since the image processing is performed with a low frequency clock rate, image data of a following frame inputted before JPEG encoding of an image is completed causes a conflict.

SUMMARY

In order to solve the problems described above, the present invention provides an image processing method and a device thereof that can minimize the delay of capturing an image through prompt encoding of YUV data.

The present invention also provides an image processing method and a device thereof that can prevent conflict between data by restricting the input of the data for a following frame while encoding a frame.

Moreover, the present invention provides an image processing method and a device thereof that can promptly transmit more data in a data transmission section by maintaining a higher clock rate for encoding YUV data than a clock rate for outputting the encoded image data.

The present invention also provides an image processing method and a device thereof in which the back-end chip can promptly decode encoded data by having valid data quickly transmitted to the back-end chip.

The present invention provides an image processing method and a device thereof that can make the hardware design and control easier by using a general interface structure when the image signal processor provides encoded data to the back-end chip.

The present invention provides an image processing method and a device thereof that can increase the process efficiency and prevent the power consumption of a receiving part (e.g. a back-end chip or a baseband chip).

The present invention provides an image processing method and a device thereof that can perform a smooth encoding operation by allowing the image signal processor to determine, in accordance with the encoding speed, whether the inputted frame is to be encoded.

The present invention provides a delay reducing device and a method thereof in image processing that can have a vertical synchronous signal (V_sync) outputted at an optical point when transferring data encoded by an encoder to the receiving part.

The present invention provides a delay reducing device and a method thereof in image processing in which the input of processed data for a current frame is not interfered by the input of the vertical synchronous signal indicating the input of a new frame when encoded data is received in the receiving part.

The present invention provides a delay reducing device and a method thereof in image processing that can increase the process efficiency and the process speed of the back-end chip by having encoded data including only valid data in making up an image transmitted to the back-end chip.

The present invention provides a delay reducing device and method thereof in image processing that can prevent power consumption caused by switching of a write enable signal for a memory of the back-end chip by maintaining a H_REF signal, which can be used by the back-end chip 130 when storing data, in a high state or a low.

In addition, the present invention provides a delay reducing device and a method thereof in image processing that can increase the process efficiency and process speed of the back-end chip by having valid data forming an image, concentrated in the front part of an outputting data column.

Other objects of the present invention will become apparent through the preferred embodiments described below.

To achieve the above objects, an aspect of the present invention features an image signal processor and/or an imaging device having the image signal processor.

According to an embodiment of the present invention, an imaging device having an image signal processor and a receiving part includes an image sensor, which generates and outputs raw data corresponding to an external image, and an image signal processor, which has an encoder and outputs to the receiving part, being a back-end chip or a baseband chip, YUV data corresponding to the raw data or encoded data generated by using the encoder. A first processing clock rate for generating the YUV data may be smaller than a second processing clock rate for generating the encoded data.

Also, the first processing clock rate may be the same as or smaller than an output clock rate for outputting the YIN data or the encoded data, or the second processing clock rate may be the same as or larger than the output clock rate.

The ratio of the first processing clock rate to the second processing clock rate may be a ratio of the size of the YUV data corresponding to a frame to the size of the encoded data. The size may include any one of the area, the width, the height, and the diagonal length.

The image sensor may generate and output the raw data to coincide with a clock signal inputted corresponding to the first processing clock rate or the second processing clock rate from the image signal processor.

The first processing clock rate may be in a preview state, and the second processing clock rate may process a frame corresponding to a capture command inputted from the receiving part.

The image signal processor may transmit a skip command to the image sensor, and the image sensor may not output raw signal corresponding to a $(k+1)^{th}$ frame, in case that a vertical synchronous signal (V_sync) indicating that the $(k+1)^{th}$ frame starts to be inputted is received from the image sensor while a $k^{th}$ frame, k being a natural number, corresponding to the capture command is processed.

The image signal processor may skip processing the raw data inputted from the image sensor in case that the vertical synchronous signal (V_sync) indicating that the $(k+1)^{th}$ frame is to start to be inputted is received from the image sensor when the $k^{th}$ frame, k being a natural number, corresponding to the capture command is being processed.

The image signal processor can comprise a buffer memory for temporarily storing, in order to transmit to the receiving part, the encoded data. In case that the amount of the encoded data stored in the memory is the same as or larger than a predetermined size, the second clock rate can be decreased.

The image sensor can control the input of the $(k+1)^{th}$ frame to be delayed while the $k^{th}$ frame, k being a natural number, corresponding to the capture command is processed.

According to the embodiment of the present invention, the image signal processor can have a clock generator, which outputs a clock signal corresponding to a processing clock rate, a control unit, which controls the clock generator to generate a clock signal corresponding to an increased processing clock rate, a sub image signal processor (ISP), which generates YUV data by using the raw signal inputted from the image sensor in accordance with the clock signal an encoding unit, which generates encoded data by using the YUV data in accordance with the clock signal, a memory, which stores the encode image data, and an output unit, which outputs the stored encoded image data, by the control of the control unit, at a predetermined point to the receiving part. The receiving part is the back-end chip or the baseband chip.

The image signal processor can further include a buffer manager, which monitors the amount of the encoded image data stored in the memory and generates monitoring information. The control unit may increase or decrease the processing clock rate by using the monitoring information.

Before the input of the capture command, the output unit can output the YUV data outputted by the sub ISP to the receiving part.

While the $k^{th}$ frame, k being a natural number, corresponding to the capture command is processed, in case that the vertical synchronous signal (V_sync) indicating that the $(k+1)^{th}$ frame is to start to be inputted is inputted from the image sensor, the control unit can transmit the skip command to the image sensor, and the image sensor may not output raw data corresponding to the $(k+1)^{th}$ frame.

The control unit can transmit the skip command to the sub ISP, and the sub ISP can skip generating YUV data corresponding to the $(k+1)^{th}$ frame, in case that the vertical synchronous signal (V_sync) indicating that the $(k+1)^{th}$ frame is to start to be inputted is inputted from the image sensor while the $k^{th}$ frame, k being a natural number, corresponding to the capture command is processed.

When the $k^{th}$ frame, k being a natural number, corresponding to the capture command is being processed, the image sensor may control the input of the $(k+1)^{th}$ frame to be delayed.

In order to achieve the above objects, another aspect of the present invention features an image processing method and/or a recorded medium recording a program for executing the method thereof.

According to an embodiment of the present invention, an image processing method of an imaging device having an image signal processor and a receiving part, can comprise the steps of (a) generating YUV data corresponding to raw data inputted from an image sensor in accordance with a first processing clock rate, and outputting the YUV data to the receiving part, which is a back-end chip or a baseband chip, in accordance with the first processing clock rate, (b) being inputted with a capture command from the receiving part, and (c) generating encoded data corresponding to the raw data inputted from the image sensor in accordance with a second processing clock rate, and outputting the encoded data to the receiving part in accordance with the second processing clock rate. The image signal processor can include an encoder, and the first processing clock rate may be the same as or smaller than the second processing clock rate.

The image sensor can generate and output the raw data to coincide with a clock signal inputted corresponding to the first processing clock rate or the second processing clock rate.

The first processing clock rate can be a preview state, and the second processing clock rate can process a frame corresponding to a capture command inputted from the receiving part.

The step (c) can have the steps of generating the encoded data inputted from the image sensor in accordance with the second processing clock rate, storing the encoded data in a buffer memory, and outputting the encoded data stored in the buffer memory to the receiving part at every predetermined point in accordance with the second output clock rate during a predetermined period. In case that the amount of the encoded data stored in the buffer memory is larger than a predetermined size, the second clock rate can be decreased.

DETAILED DESCRIPTION

Figure 1:
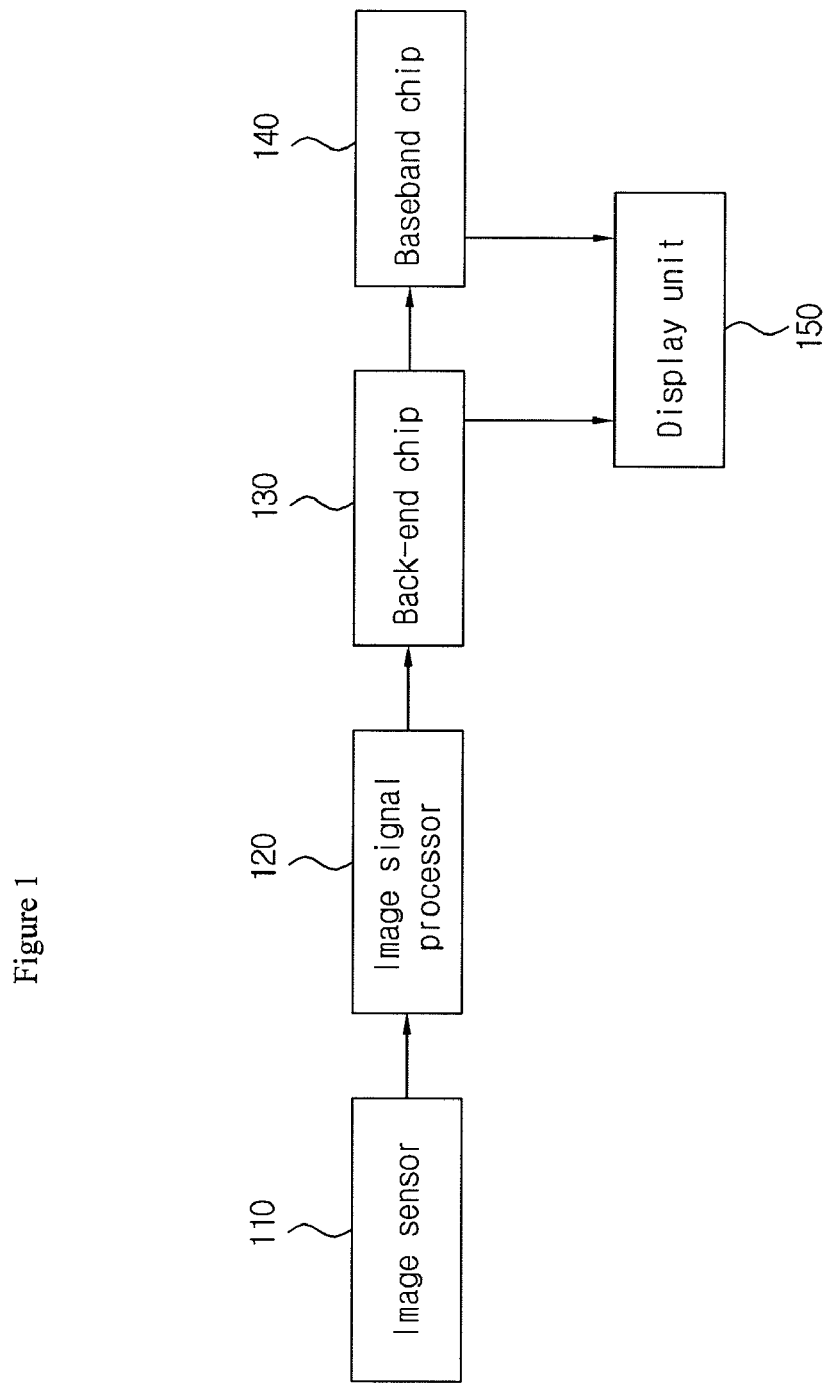
FIG. 1 shows a simple structure of a typical imaging device.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 4:
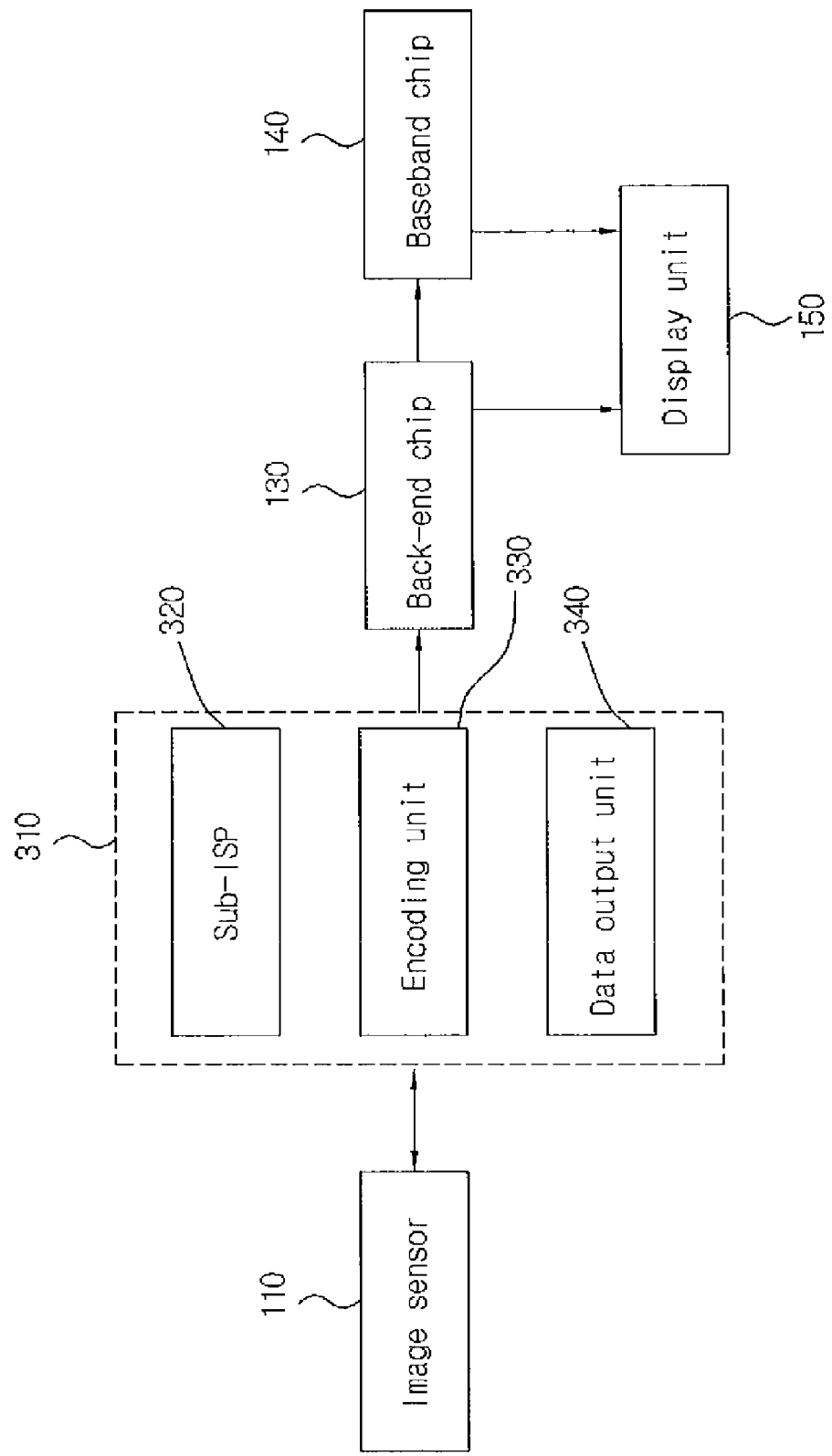
FIG. 4 shows the block diagram of an imaging device in accordance with an embodiment of the present invention.
Figure 5:
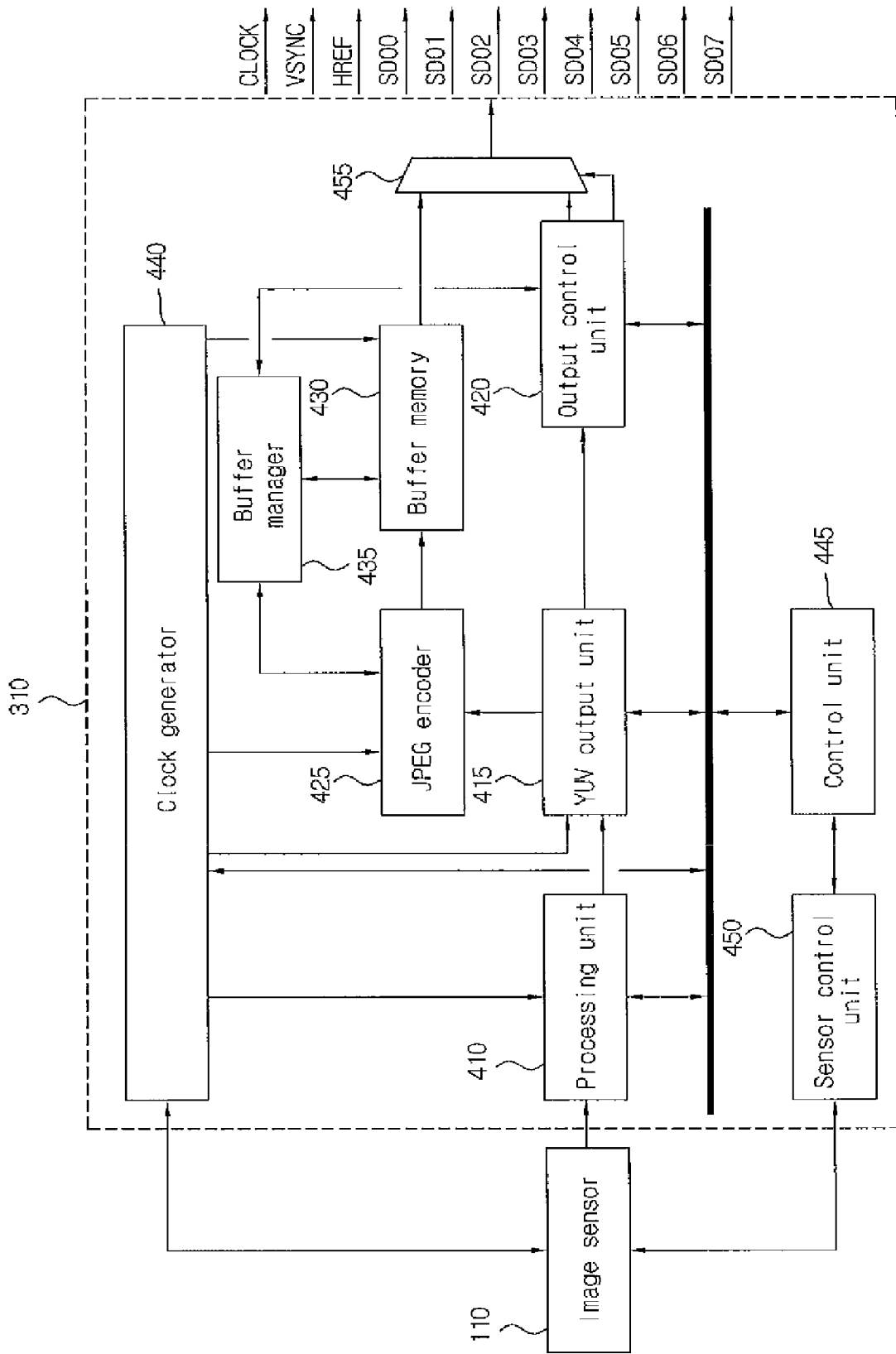
FIG. 5 shows the block diagram of an image signal processor in accordance with an embodiment of the present invention.

FIG. 4 shows the block diagram of an imaging device in accordance with an embodiment of the present invention, and FIG. 5 shows the block diagram of an image signal processor in accordance with an embodiment of the present invention.

Referring to FIG. 4, the imaging device of the present invention comprises an image sensor 110, an image signal processor 310, a back-end chip 130, a baseband chip 140, and a display unit 150.

The image sensor 110 generates and outputs to the image signal processor 310 raw data corresponding to an external image. The image sensor 110 can use a clock signal inputted from a clock generator 440 (refer to FIG. 5) when generating and outputting the raw data. Since the process, which the image sensor 110 generates and outputs the raw data corresponding to an external image, shall be evident to any persons of ordinary skill in the art, the pertinent detailed description will be omitted.

The image signal processor 310 converts the raw data inputted from the image sensor 110 into YUV data or encoded data to output the converted data to the back-end chip 130. The YUV data is outputted in a preview state, where the data inputted through the image sensor 110, without generating an image data, is displayed on the display unit 150 before the input of a photographing command from a user. JPEG encoded data for a corresponding frame is outputted in case that a capture command (e.g. a command for generating an image data having the photographed external image) is inputted. Generally, the imaging device is put in the preview state before the input of the capture command and after the completion of encoding the image data corresponding to the capture command.

The image signal processor 310 can include a sub image signal processor (ISP) 320, an encoding unit 330, and a data output unit 340, for example. The image signal processor 310 can further have a clock generator, and a sensor control unit. The sub ISP 320 can comprise a pre-processing unit 410 and a YUV output unit 415. Although the present description assumes that the encoding unit 330 is a JPEG encoder, it shall be evident that the encoding unit 330 can be an encoder for encoding other format data. The data output unit 340 can include a buffer memory 430 and a buffer manager 435.

Referring to FIG. 5, which illustrates a structure of the image signal processor 310 in detail, the image signal processor 310 can have a pre-processing unit 410, a YUV output unit 415, an output control unit 420, a JPEG encoder 425, the buffer memory 430, a buffer manager 435, the clock generator 40, a control unit 445, a sensor control unit 540, and a multiplexer (MUX) 455.

The pre-processing unit 410 processes the raw data inputted from the image sensor 110, and outputs high solution YUV data. The pre-processing unit 410 can improve the image quality such as an image color and brightness. The preprocessing unit 410 can be the same as or very similar to a conventional image signal processor 120.

The YUV output unit 415 converts the high resolution YUV data, inputted from the pro-processing unit 410, into low resolution YUV data corresponding to a predetermined vertical line number and horizontal pixel number, and output the low resolution YUV data to the output control unit 420. A user can preset or predetermine the vertical line number and horizontal pixel number for previewing.

The YUV output unit 415 can provide the high resolution YUV data to the JPEG encoder 425 by the control of the control unit 445 that has received the capture command from the back-end chip 130 through an I2C and a SPI. The JPEG encoded 425 shall generate JPEG encoded data by using the high resolution YUV data inputted from the YUV output unit 415. In case that raw data of a following frame (e.g. a $(k+1)^{th}$ frame) starts to be inputted from the image sensor 110, while a frame (e.g. a $k^{th}$ frame), k being a natural number, corresponding to the capture command by the JPEG encoder 425 is processed, the YUV output unit 415 may not input the high resolution YUV data corresponding to the following frame into the JPEG encoder 425 by the control of the control unit 445.

The output control unit 420, by the control of the control unit 445, controls the multiplexer 455 to perform a switching operation to output the low resolution YUV data or the encoded data to the back-end chip 130. FIG. 5 illustrates that the output control unit 420 is provided on a transmission path of the low resolution YUV data between the YUV output unit 415 and the multiplexer 455. In case that the output control unit 420 controls the multiplexer 455 only, the output control unit 420 may be provided on a control path between the control unit 445 and the multiplexer 455. The low resolution YUV data can be transmitted to the back-end chip 130 for previewing, and the encoded data can be transmitted to the back-end chip 130 to store and/or decode compressed image data.

The JPEG encoder 425 generates JPEG encoded data by using the high resolution YUV data inputted from the YUV output unit 415, and stores the JPEG encoded data in the buffer memory 430. Since the JPEG encoding process has been described above in detail, the pertinent description will be omitted.

The buffer memory 430 can have a ring-like shape. In the buffer memory 430, JPEG encoded data can be written in the inputted order, and new data can be overwritten in the read order. Of course, the read data can be set to be deleted. The JPEG encoded data written in the buffer memory 430 can be restricted to valid data (e.g. data for actually forming an image). It can be determined by at least one of the JPEG encoder 425, the buffer manager 435 and the control unit whether the JPEG encoded data outputted from the JPEG encoder 425 is valid data or invalid data. The buffer memory 430 can be set to have a blank written or following valid data written successively at a point that invalid data is outputted and written. Padding data (i.e. data to perfunctorily satisfy the horizontal pixel number) may be outputted to the back-end chip 130 for the point that the invalid data is written as the blank.

The buffer manager 435 monitors the amount of JPEG encoded data written in the buffer memory 430 to manage the buffer memory capacity from being used completely (i.e. not to lack the buffer memory capacity). The buffer manager 435 provides information monitored on the buffer memory 430 (hereinafter, referred to as "monitoring information") to the control unit 445. Also, the buffer manager 435 allows the data written in the buffer memory 430 to be outputted to the back-end chip 130 at every predetermined point (e.g. the point at which the H_REF signal is changed to a high state). Besides, the buffer manager 435 allows a clock signal (P_CLK), a vertical synchronous signal (V_sync), and a valid data enable signal (H_REF) to be outputted to the back-end chip 130.

The function of the buffer manager 435 is described below in detail.

The buffer manager 435 allows an output wave having the same wave type as a conventional output wave to be generated and outputted to the back-end chip 130. Also, the buffer manager 435 manages the buffer memory 430 to function as a buffer for outputting data when reducing a clock rate. This is because the clock rate is needed to be decreased to output JPEG encoded data, as the image signal processor 310 of the present invention sets a higher clock rate for an encoding process (hereinafter, referred to as a "process clock rate") than a clock rate for outputting JPEG encoded data (hereinafter, referring to as a "output clock rate"). Further, since the decrease of the clock rate makes it possible to output the JPEG encoded data having the same wave type as the conventional output wave, a conventional back-end chip 130 can be port-matched with the image signal processor 310 of the present invention.

The buffer manger 435 sums up the amount of JPEG encoded data, stored in the buffer memory 430 and outputted through the multiplexer 455, to check the file size. By delivering the corresponding information to the control unit 455, the buffer manager 435 can adjust a compression rate to output a stable amount of JPEG encoded data linked with the clock rate. A scale factor, which is an assigned variable between 0 and 255, determines the image quality and the compression rate. A larger scale factor makes a high compression rate but low image quality. A smaller scale factor makes high image quality but a low compression rate. The control unit 445 can control the clock rate without loss in an output buffer by adjusting the scale factor in accordance with the amount of JPEG encoded data stored in the buffer memory 430. Accordingly, this can solve the problem of the written data being overwritten by new data before being read due to an excessive process clock rate for generating encoded data.

When processing a frame corresponding to the capture command, the control unit 445 checks whether a maximum buffer capacity (i.e. a predetermined storage limit within the total buffer capacity) is completely used, and also, checks the output stability considering the present clock rate in accordance with the result of checking the maximum buffer capacity. Then, the scale factor is increased in case that too much data is stored in the buffer memory 430. In this case, it is preferable that the scale factor is set to be gradually increased.

In another method, the control unit 445 can adjust the scale factor by counting the valid data (e.g. data to actually form an image) only among the JPEG encoded data for a frame (i.e. FFD8 (start mark) to FFD9 (end mark)). It may be recognized by at least one of the JPEG encoder 425, the buffer manager 435 and the control unit 445 whether the data outputted from the JPEG encoder 425 is valid data or invalid data.

In yet another method, which adjusts the blur level and limits the data amount during more minute adjustment, the control unit 445 can use the pre-processing unit 410.

The clock generator 440 generates and provides to each element by the control of the control unit 445 a clock signal corresponding to a clock rate. Also, by the control of the control unit 445 that has received the capture command, the clock generator 440 generates a clock signal corresponding to the process clock rate and outputs the generated clock signal to the corresponding elements (e.g. the pre-processing part 410, the YUV output unit 415, the JPEG encoder 425 and the buffer manager 435). The clock signal generated by the clock generator 440 is inputted to the image sensor 110 such that the image sensor 110 is linked to the image signal processor 310.

The clock generator 440 can generate and output to the back-end chip a clock signal corresponding to the output clock rate.

As in the conventional art, the clock generator 440 may maintain a process clock rate that is smaller than the output clock rate before the capture command is inputted to the image signal processor. However, if the capture command is inputted to the image signal processor by the control of the control unit 445, the present process clock rate (hereinafter, referred to as a "second clock rate") is allowed to be larger than the process clock rate in a preview state (hereinafter, referred to as a "first process clock rate"), which means that the second process clock rate is larger than the first process clock rate. In this case, the limit value (i.e. the upper limit) of the second process clock rate can be preset. Also, the increased second process clock rate can be larger or smaller than the output clock rate.

In other words, once the capture command is inputted, the first process clock rate is increased to be updated into the second process clock rate. In this case, an increasing rate from the first process clock rate to the second process clock rate can be determined by the amount of data that is processed by each process clock rate. Generally, in a preview mode, the displayed image has the same size as or smaller than the size of the display unit 150. The image encoded by the capture command is generated regardless of the size of the display unit 150. The size of the generated image can be predetermined. However, the encoded image is displayed on the display unit 150 in accordance with the size of the display unit 150 or the display size of the preview mode. Accordingly, the ratio of the first process clock rate to the second process clock rate can be a ratio of the data size for a preview mode (e.g. the preview image size of 320×240) to the size of data to be encoded (e.g. 640×480). Here, the respective data can be any one of the area, the width, the height and the diagonal length.

The upper limit of the second process clock rate can be the limit value below which the difference between the amount of data written in the buffer memory 430 (i.e. input amount) and the amount of data transmitted to the back-end chip 130 (i.e. output amount) is smaller than the storage capacity of the buffer memory 430 (or the maximum buffer capacity). Of course, even though the second process clock rate is determined to be smaller than the above-described upper limit, in case that the balance between the input amount and the output amount becomes larger than the storage capacity of the buffer memory 430 (or the maximum buffer capacity), the second process clock rate can be decreased to protect the not-read data, written in the buffer memory 430. The buffer manager 435 can control the second process clock rate to be increased or decreased. Alternatively, by using the monitoring information provided from the buffer manager 435, the control unit 455 can control the second process clock rate.

In addition, the clock generator 440 can have other various applications to allow the second process clock rate to be relatively increased over the first process clock rate. For example in case that the process clock rate is uniformly maintained and the output clock rate is adjustable, the clock generator 440 can relatively decrease the output clock rate. In this case, the receiving part must recognize the adjusted output clock rate and perform a corresponding operation. As described above, by the control of the control unit 445 or the buffer manager 435, the output clock rate can be decreased and the process clock rate can be increased, over the conventional art. For example, in case that the process clock rate is increased, it is evident that each element can be more promptly encoded. In case that the output clock rate is decreased, the respective elements can occupy more time for encoding process.

In the preview state, the control unit 445 controls the low resolution YUV data that is outputted from the YUV output unit 415 to be outputted to the back-end chip 130 through the multiplexer 455, and controls each element to minimize the delay when encoding the corresponding frame, once the capture command is inputted from the back-end chip 130. Also, the control unit 445 controls the output control unit 420 to set a path of the multiplexer 455 to output corresponding data in accordance with a present operation state (e.g. the preview state or a capture command input state). Further, to allow the encoding process of the frame (i.e. a $k^{th}$ frame), k being a natural number, corresponding to the capture command not to be interfered by the input of the following frame (i.e. a $(k+1)^{th}$ frame) or prevent conflict between data, the output of the raw data for the following frame (in this case, the $(k+1)^{th}$ frame only can be restricted) can be blocked by controlling the image sensor 110 through the sensor control unit 450. Of course, during the encoding process of the frame according to the capture command, in case that the raw data of the following frame starts to be inputted from the image sensor 110, the control unit 445 controls the YUV output unit 415 to stop inputting the high resolution YUV data corresponding to the following frame into the JPEG encoder 425. In case that there is further provided switching means between the image sensor 110 and the preprocessing unit 410, the control unit 445 controls the switching means to stop the input of the raw data outputted from the image sensor 110 into the preprocessing unit 410.

The sensor control unit 450 can control the output of the image sensor 110 by the control of the control unit 445. For example, in case that a skip command of the following frame for encoding the frame corresponding to the capture command is inputted from the control unit 445, the sensor control unit 450 can control not to output the raw data corresponding to the following frame. Of course, other various methods can be applied, and these methods will be described later with reference to related figures in detail.

The multiplexer 455 performs a switching operation by the control of the output control unit 420. In particular, once the output control unit 420 requests the path for outputting the low resolution YUV data as the preview state to be set, the path for outputting the low resolution YUV data, outputted from the YUV output unit 415, to the back-end chip 130 is set. Alternatively, once the output control unit 420 requests the path for outputting the JPEG encoded data corresponding to the capture command to be set, the path for outputting the JPEG encoded data, stored in the buffer memory 430, to the back-end chip 130 is set.

Hereinafter, the operation process of the image signal processor 310 of the present invention will be described with reference to FIG. 5.

First, the operation process of the image signal processor 310 and the image sensor 110, using a first process clock rate, in a preview state will be described.

The image sensor 110 generates and inputs into the pre-processing unit 410 raw data corresponding to an external image. The pre-processing unit 410 generates and outputs high resolution YUV data by processing the raw data with a predetermined method.

The YUV output unit 415 converts the high resolution YUV data into low resolution YUV data meeting a preset vertical line number and horizontal pixel number to output to the output control unit 420. As described above, in case that the output control unit 420 is only for controlling the switching operation of the multiplexer 455, the output control unit 420 can be provided on a path between the control unit 445 and the multiplexer 455.

The YUV output unit 415 can also provide the high resolution YUV data to the JPEG encoder 425. It can be not for the generation of the JPEG encoded data by using the high resolution YUV data but for the pre-recognition of the compressed image data amount to be outputted in case that a capture command is inputted. The JPEG encoder 425 can pre-recognize or receive from the control unit 445 the vertical line number and horizontal pixel number related to image data to be processed.

The output control unit 420 transfers the low resolution YUV data, inputted from the YUV output unit 415, to the back-end chip 130 through the multiplexer 455. Since the case of the capture command being inputted is not a usual case, the default path set by the multiplexer 455 can be a path for outputting the low resolution YUV data. When the capture command is inputted, the multiplexer 455 may change the path, by the control of the output control unit 420, such that JPEG encoded data is outputted.

The back-end chip 130 allows a preview operation to be performed by outputting an image corresponding to the display unit 150 with the low resolution YUV data inputted from the image signal processor 310.

When the preview operation is performed by using the low resolution YUV data, it shall be evident that quick data transmission can be made regardless of the clock rate because the small data amount communicated between the image signal processor 310 and the back-end chip 130. Accordingly, the process clock rate of the clock generator 440 can be applied as the conventional art.

If the communication data amount is required to be decreased for a smooth preview operation, a subsampling operation can be performed by the image sensor 110 and/or the YUV output unit 415.

However, as described above, in case that the JPEG encoded data corresponding to the external image in accordance with the capture command inputted from the user is transmitted to the back-end chip 130, the transmission of large image data can be lagged. It is because the encoded data to be encoded by the capture command (i.e. the high resolution YUV data) is larger than the data outputted for previewing (i.e. the low resolution YUV data). Hereinafter, a method of reducing the lag of the image signal processor will be described.

While the imaging device is operated in a preview state, if a shutter (or a photographing button) is depressed, the image signal processor 310 (or the control unit 445) receives a capture command from the back-end chip 130 through I2C or SPI. The control unit 445, which has received the capture command, controls the clock generator 440 such that a second process clock rate can be the same as or larger than a first process clock rate. In this case, the second process clock rate can be the same as or larger than an output clock rate, or the second process clock rate can be smaller than the output clock rate. As such, it shall be evident that a clock signal corresponding to the increased second process clock rate can be used in each element for image data encoding, and the decreased output clock rate can be used for outputting the JPEG encoded data.

The image sensor 110 generates and outputs to the preprocessing unit 410 raw data corresponding to an external image. The preprocessing unit 410 generates and outputs the high resolution YUV data by processing the raw data with a predetermined method. In this case, the image sensor 110 outputs the raw data to correspond to the second process clock signal (or a clock signal in accordance with the second process clock signal). The preprocessing unit can perform preprocessing to correspond to the second process clock rate.

Although a coding process can be completed, in accordance with the present invention, since the JPEG encoded data (or valid data) is concentrated in the front part of the vertical pixel number, and only padding data can be disposed in the rear part of the vertical pixel number, it is not necessary to read data as much as the vertical pixel number.

The buffer manager 435 monitors the buffer memory 430 and transmits monitoring information to the control unit 445. The control unit 445 can control the clock generator 440 to adjust the process clock rate (or the output clock rate) by using the monitoring information inputted from the buffer manager 435. For example, the control unit 445 can control the process clock rate (or the output clock rate) such that the JPEG encoded data stored in the buffer memory 430 can be maintained to be the same as or smaller than the maximum buffer capacity among the storage capacity of the buffer memory 430. That is, the process clock rate (or the output clock rate) is controlled to allow the JPEG encoded data, written in the buffer memory 430, before being transmitted to the back-end chip 130 not to be overwritten by new data or the unread data not to be deleted in order to store new data.

Figure 2:
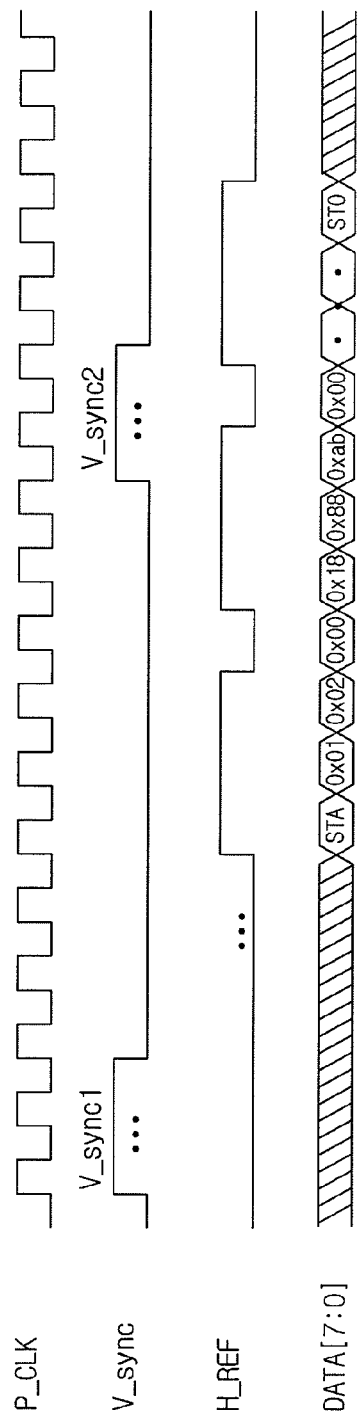
FIG. 2 shows signal types for which encoded data is conventionally outputted.
Figure 3:
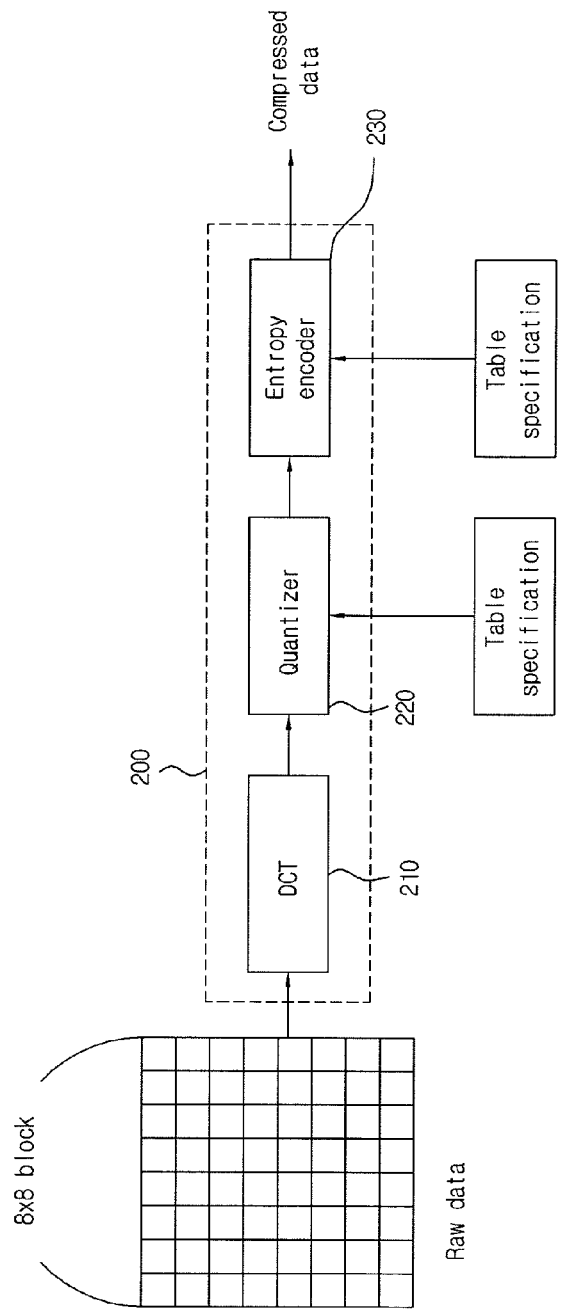
FIG. 3 shows the steps of typical JPEG encoding.

The JPEG encoded data stored in the buffer memory 430 is outputted during a data output section from an output point (e.g. where the H-REF signal is changed to the high state in FIG. 2). The valid data only of data outputted from the JPEG encoder 425 can be written in the buffer memory 430. In this case, the valid data only can successively outputted, or the padding data can be outputted in a section where invalid data is outputted. The output signal having the same wave type as a conventional output signal can be generated by the control of the buffer generator 435 or the control unit 445. The encoded data, stored in the buffer memory 430, can be read by the buffer manager 435 or the output control unit 420 to be inputted into the multiplexer 455.

Since the path of the multiplexer 455 is set to output the JPEG encoded data by the control of the output control unit 420, the JPEG encoded data outputted from the buffer memory 430 is outputted to the back-end chip 130 through the multiplexer 455.

Figure 11:
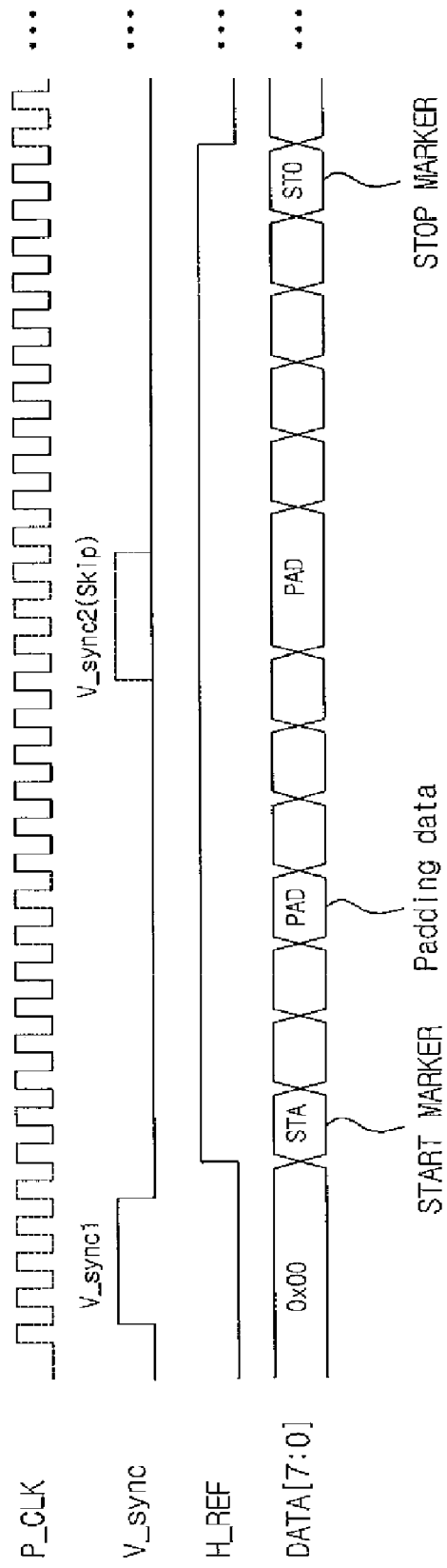

In case that raw data for a new frame is inputted from the image sensor 110 into the image signal processor 310 while the JPEG encoder 425 performs the encoding process of a frame corresponding to the capture command, the control unit 445 can control the YUV output unit 415 to allow corresponding high resolution YUV data not to be inputted into the JPEG encoder 425 or the preprocessing unit 410 not to receive corresponding raw data. Of course, in case that switching means is further provided between the image sensor 110 and the preprocessing unit 410, the control unit 445 controls the switching means such that the raw data outputted from the image sensor 110 cannot be inputted into the preprocessing unit 410. By the above-described methods, the input and/or the process of the data corresponding to the following frame can be omitted. As a result, the V_sync2 signal illustrated in FIG. 11 is not required and thus can be skipped to be outputted to the back-end chip 130. It shall be evident that other data corresponding to the V_sync2 signal is not outputted to the back-end chip 130 in case the V_sync2 signal is not outputted to the back-end chip 130.

Hitherto, a method of skipping the process of an inputted following frame (e.g. a $(k+1)^{th}$ frame) to smoothly process data for a frame (e.g. a $k^{th}$ frame) has been described Other various methods that can perform data encoding of the image signal processor 310 without an error, and communication of JPEG encoded data between the image signal processor 310 and a receiving part (e.g. the back-end chip 130 or the baseband chip 140) in addition to the above-described method will be hereinafter described with reference to related drawings.

Figure 6:
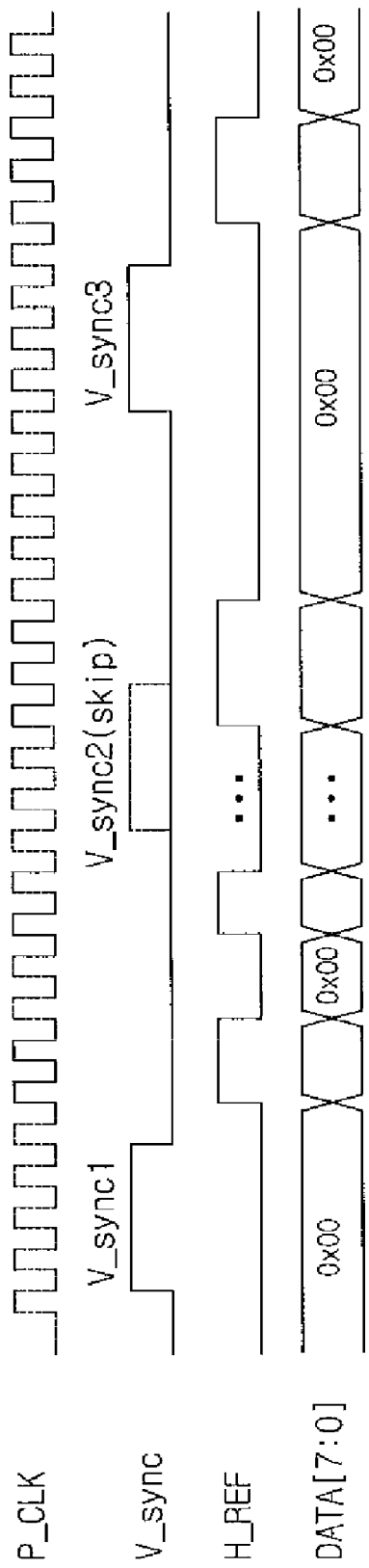
FIG. 6 shows signal types for which an image signal processor outputs encoded data in accordance with an embodiment of the present invention.

FIG. 6 shows signal types for which an image signal processor 310 outputs encoded data in accordance with an embodiment of the present invention. FIG. 6 illustrates that data written in the buffer memory 430 with a predetermined delay of time is successively outputted.

The illustrated signal type can be generated and outputted by the buffer manager 435 or the control unit 445. In case that the signal type is generated and outputted by the control unit 445, the buffer manger 435 shall have the JPEG encoded data, written in the buffer memory 430, output to the receiving part during a predetermined section (e.g. a section during which the H_REF signal (the valid data enable signal) is maintained in a high state). The receiving part recognizes the H_REF signal as a write enable signal, and data corresponding the H_REF signal is written in a memory of the receiving part. By this method, valid data only shall be stored in the memory of the receiving part. Although invalid data or padding data is expressed as "0x00" in FIG. 6, this does not represent any specific data.

The clock signal (P_CLK) outputted to the receiving part by the buffer manager 435 or the control unit 445 can be a clock signal generated from the clock generator 440 or provided in accordance with a preset output clock rate. As illustrated in FIG. 6, the clock signal can be outputted to the receiving part only while the valid data is outputted. During a section where the invalid data or the padding data is outputted, no clock signal can be outputted to the receiving part (or the clock signal is maintained in a low state). Of course, the clock signal can continue to be outputted (the same throughout the following drawings). It is evident that new data corresponding to a new frame shall be outputted as the illustrated V_sync signal follows.

In case that the V_sync2 signal corresponding to the $(k+1)^{th}$ frame is inputted from the image sensor 110 while encoding a $k^{th}$ frame corresponding to a V_sync1 signal, the image signal processor 310 provides the skip command to the image sensor 110 or an element by the above-described method such that the process of the $(k+1)^{th}$ frame can be skipped. In this case, since the V_sync2 signal does not need to be outputted to the receiving part, the output of the V_sync2 signal is skipped, as illustrated in FIG. 6. The input of the V_sync signal can be determined by detecting a rising edge or a falling edge.

The buffer manager 435 or the control unit 445 can recognize the information on the start and end of JPEG encoding by capturing "START MARKER" and "STOP MARKER" from the header and/or tail of the JPEG encoded data that is stored in the buffer memory 430.

Accordingly, although each raw data corresponding to frames #1, #2 and #3 is successively inputted, the encoded data outputted from the image signal processor 310 can be restricted to data for the frames #1 and #3 only.

Figure 7:
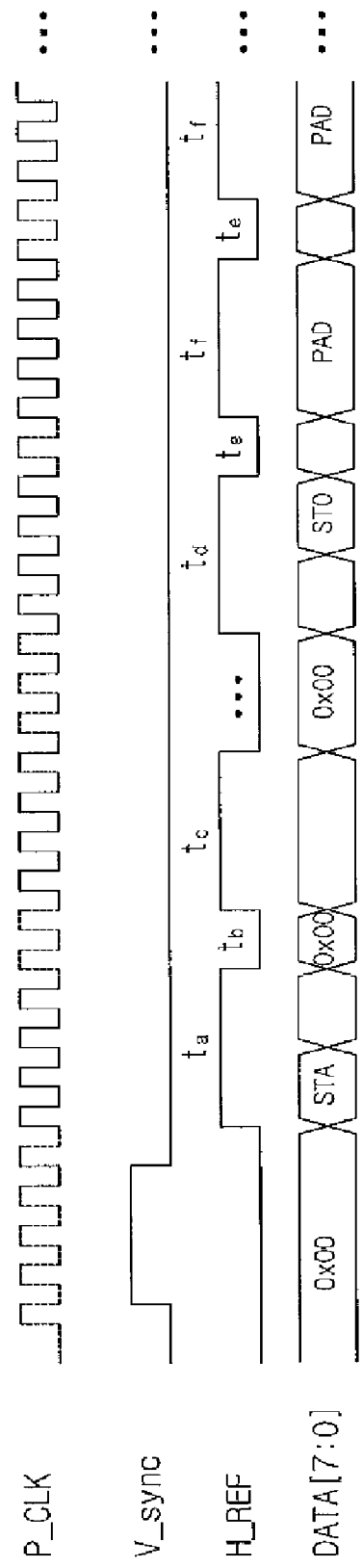
FIG. 7 shows signal types for which an image signal processor outputs encoded data in accordance with another embodiment of the present invention.
Figure 8:
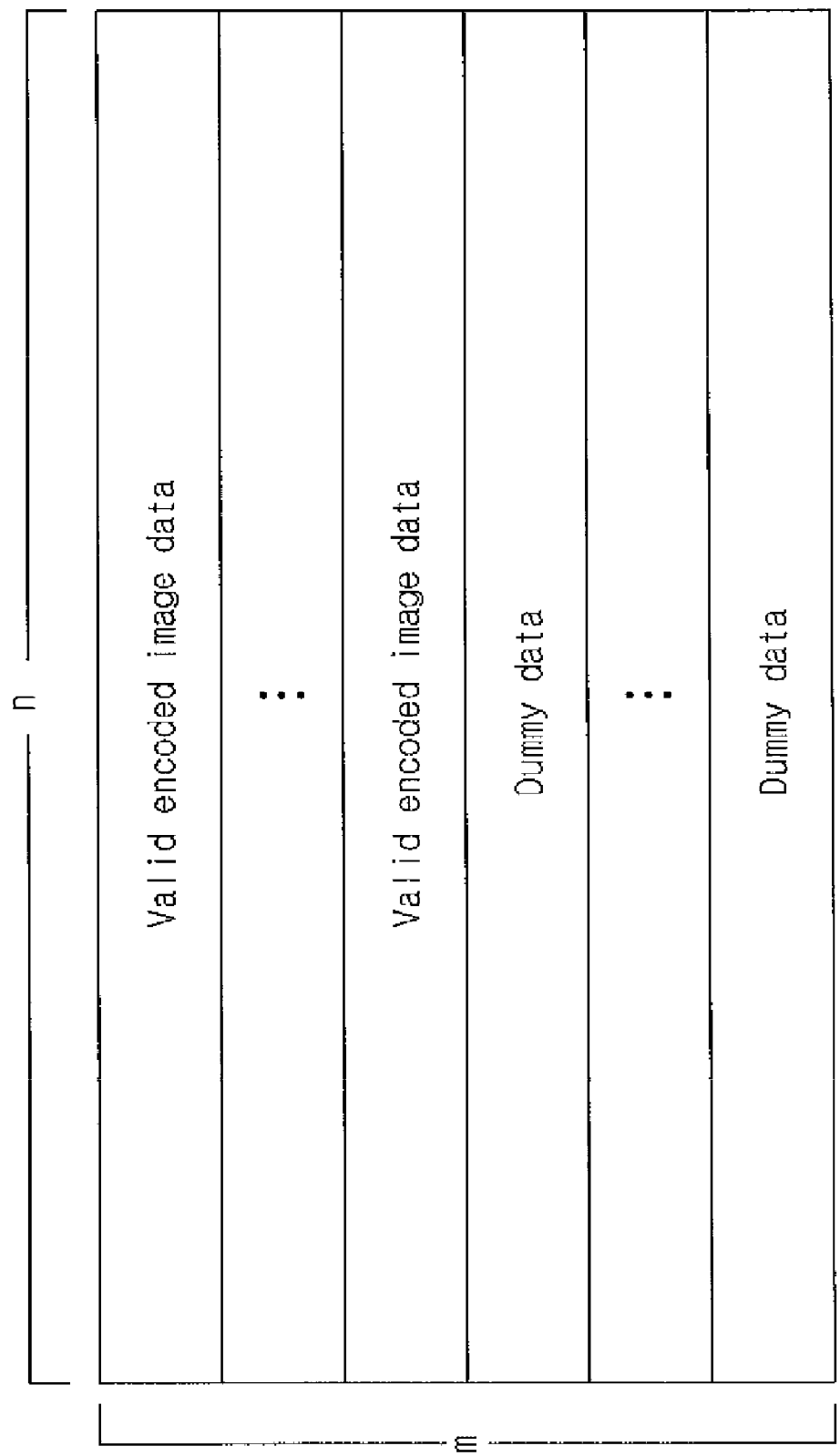
FIG. 8 shows the conceptual diagram of how data, which are sent from the image signal processor and accumulated in the memory of a back-end chip, are stored in accordance with another embodiment of the present invention.
Figure 9:
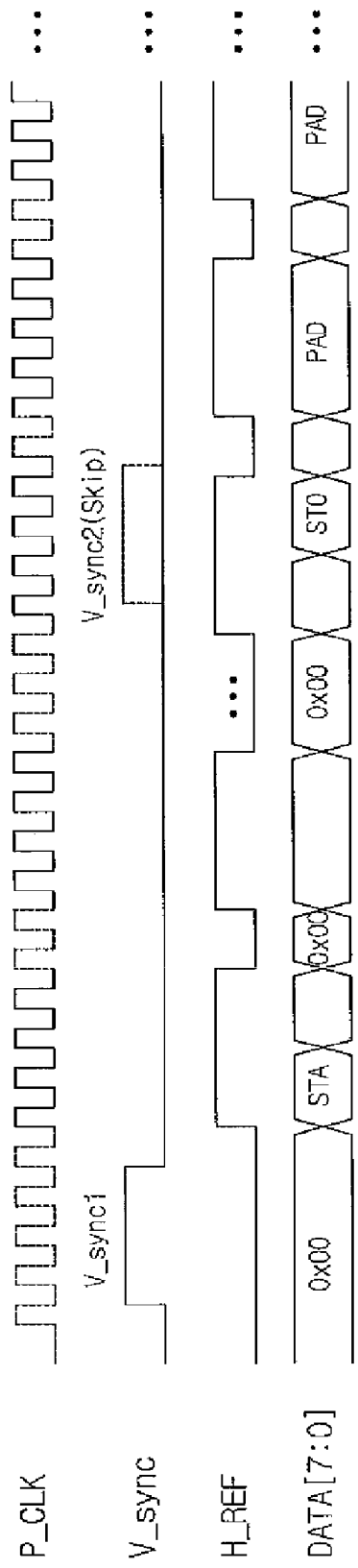
FIG. 9 shows signal types for which the image signal processor outputs encoded data in accordance with another embodiment of the present invention.

FIG. 7 shows signal types for which an image signal processor 310 outputs encoded data in accordance with another embodiment of the present invention, and FIG. 8 shows the conceptual diagram of how data, which are sent from the image signal processor and accumulated in the memory of a back-end chip, are stored in accordance with yet another embodiment of the present invention. FIG. 9 shows signal types for which the image signal processor 310 outputs encoded data.

FIGS. 7 through 9 illustrate the case of valid data of a size predetermined in the buffer memory 430 being outputted to a receiving part at every point on which the valid data is written.

The illustrated signal type can be generated and outputted by the buffer manager 435 or the control unit 445. In case that the signal type is generated and outputted by the control unit 445, the buffer manger 435 shall have valid data of JPEG encoded data, written in the buffer memory 430, output to a receiving part during a predetermined section (e.g. a section during which the H_REF signal is maintained in a high state). It can be set such that only the valid data is written in the buffer memory. The receiving part recognizes the H_REF signal as a write enable signal, and data corresponding to the H_REF signal is written in a memory of the receiving part. By this method, only the valid data shall be stored in the memory of the receiving part (refer to FIG. 8). Although invalid data or padding data is expressed as "0x00" in FIG. 7 and FIG. 9, this does not represent any specific data.

As illustrated above, in accordance with another embodiment of the present invention, only the valid data, excluding the invalid data, of the JPEG encoded data is detected and accumulated in the buffer memory 430 as much as a predetermined line size (i.e. "n" in FIG. 8, and for example, the size of data to be transmitted while the H_REF signal is maintained in a high state). Accordingly, all valid data for the $k^{th}$ frame can be outputted to the receiving part before being repeated as much as a predetermined column size (i.e. "m>" in FIG. 8, and for example, the total quantity of the data where the H_REF signal for a frame is changed to a high state). In this case, it is recognized that the JPEG encoded data of a predetermined line size×the column size (and/or padding data) has not yet been received from the image signal processor 310, and thus, the process of the JPEG encoded data may not be processed. To prevent this, the buffer manager 435 or the control unit 445 outputs during a "tf" time the padding data as much as remaining column number (i.e. the predetermined column number−the column number consisting of the valid data). Since the time of each section for outputting the valid data accumulated in the buffer memory 430 is the time of outputting the data having the predetermined size, every time is identical to each other (i.e. ta=tc=td=tf). However, the time for accumulating related data may not be identical to each other. In case that the valid data is successively provided, the time for accumulating the data can be reduced. In this case, a standby time before the output of the padding data (e.g. "te") shall be identical to each other The clock signal (P_CLK) outputted to the receiving part by the buffer manager 435 or the control unit 445 can be a clock signal generated from the clock generator 440 or provided in accordance with a preset output clock rate. As illustrated in FIG. 7 and FIG. 9, the clock signal can be outputted to the receiving part only while the valid data is outputted. During a section where the invalid data or the padding data is outputted, no clock signal can be outputted to the receiving part (or the clock signal can be maintained in a low state). It is evident that new data corresponding to a new frame shall be outputted as the illustrated V_sync signal follows.

In case that the V_sync2 signal corresponding to the $(k+1)^{th}$ frame is inputted from the image sensor 110 while encoding the $k^{th}$ frame corresponding to the V_sync1 signal, the image signal processor 310 provides the skip command to the image sensor 110 or an element by the mentioned method such that the process of the $(k+1)^{th}$ frame can be skipped. In this case, since the V_sync2 signal does not need to be outputted to the receiving part, the output of the V_sync2 signal is skipped, as illustrated in FIG. 9. The buffer manager 435 or the control unit 445 can recognize the information on the start and end of JPEG encoding by capturing "START MARKER" and "STOP MARKER" from the header and/or tail of the JPEG encoded data that is stored in the buffer memory 430.

Accordingly, even though each raw data corresponding to frames #1, #2 and #3 is successively inputted, the encoded data outputted from the image signal processor 310 can be restricted to data for the frames # 1 and # 3 only.

Figure 10:
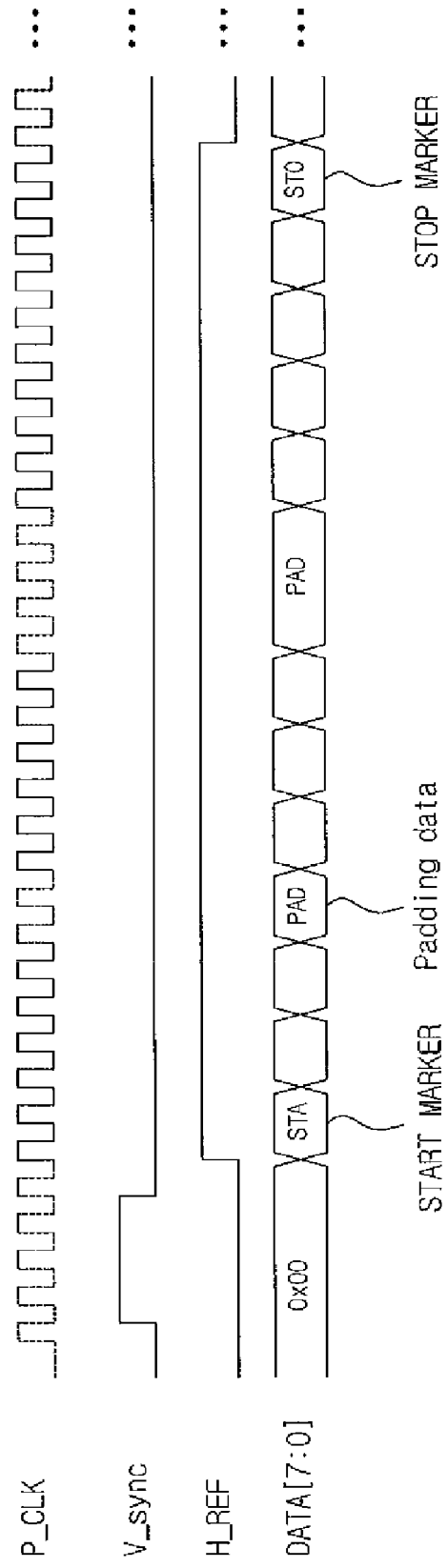
FIG. 10 and FIG. 11 show signal types for which the image signal processor 310 outputs encoded data in accordance with yet another embodiment of the present invention.

FIG. 10 and FIG. 11 show signal types for which the image signal processor 310 outputs encoded data in accordance with yet another embodiment of the present invention.

The signal types illustrated in FIG. 10 and FIG. 11 maintain a H_REF signal of high state while outputting all JPEG encoded data for a frame. While the H_REF signal of high state is maintained, valid data and padding data (or invalid data) are successively outputted to a receiving part.

It is because there can be unnecessary power consumption in the receiving part due to the alternation of the H_REF signal that is recognized as a write enable signal in the receiving part.

In this case, similarly, it shall be evident that the V_sync2 signal for the $(k+1)^{th}$ frame, inputted during the present processing of the $k^{th}$ frame, can be skipped, and the data input and process in accordance with the V_sync2 signal can be skipped.

Figure 12:
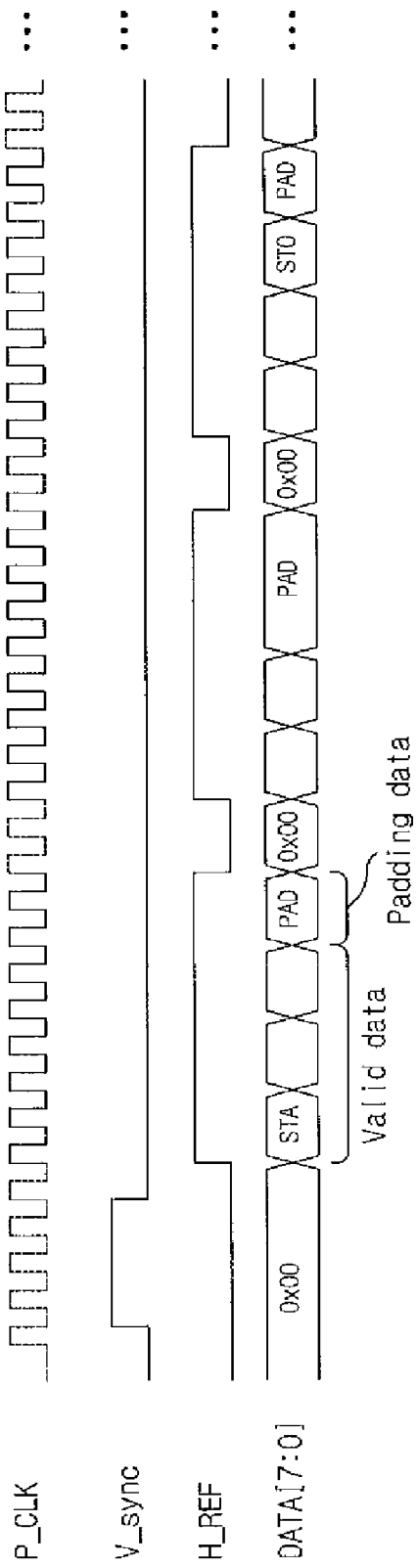
FIG. 12 shows signal types for which the image signal processor outputs encoded data in accordance with still another embodiment of the present invention.
Figure 13:
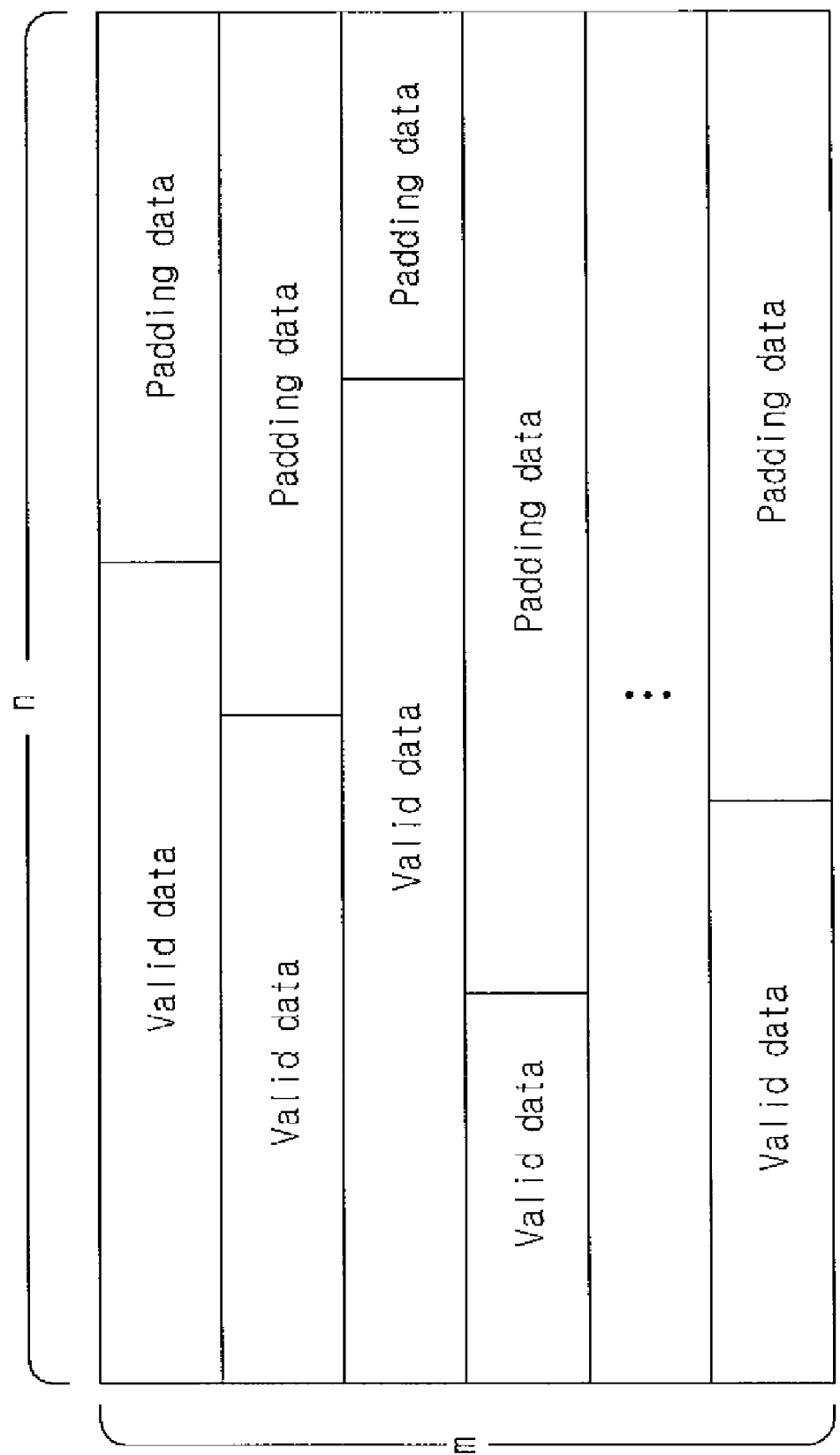
FIG. 13 shows the conceptual diagram of how data, which are sent from the image signal processor and accumulated in the memory of a back-end chip, are stored in accordance with another embodiment of the present invention.
Figure 14:
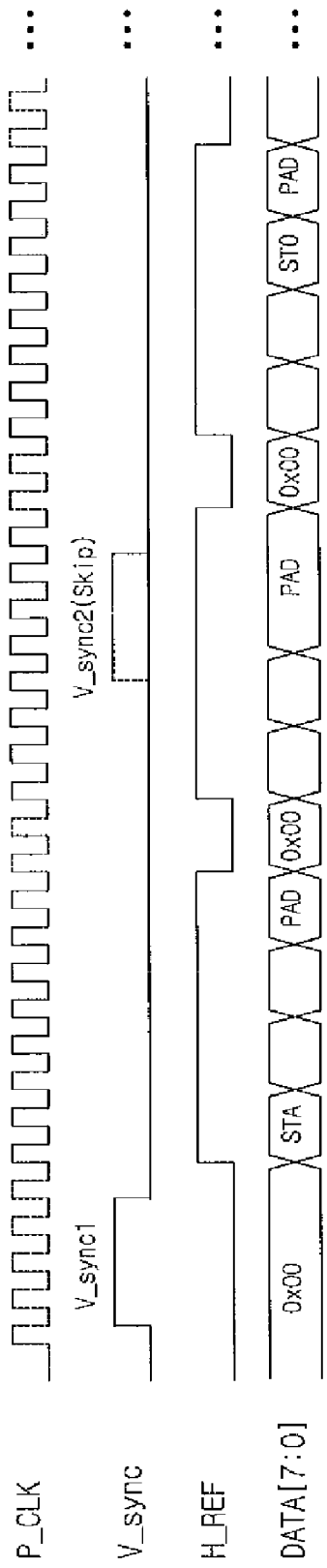
FIG. 14 shows signal types for which the image signal processor outputs encoded data in accordance with another embodiment of the present invention.

FIG. 12 shows signal types for which the image signal processor 310 outputs encoded data in accordance with another embodiment of the present invention, and FIG. 13 shows the conceptual diagram of how data, which are sent from the image signal processor and accumulated in the memory of a back-end chip, are stored in accordance with yet another embodiment of the present invention. FIG. 14 shows signal types for which the image signal processor 310 outputs encoded data in accordance with still another embodiment of the present invention;

Comparing with the above-described FIGS. 7 through 9, FIGS. 12 through 14 illustrate that the data written in the buffer memory 430 during a predetermined period are outputted at every predetermined point. That is, the time for which data is accumulated in the buffer memory 430 and the time for which the accumulated data is outputted are predetermined. If the data written in the buffer memory 430 during the predetermined time does not meet the predetermined size, the insufficient amount is added to the padding to be sent to the receiving part.

In this case, data in the same type as in FIG. 8 are written in the memory of the receiving part. The receiving part can improve the processing speed by reading not all data in the size of n×m but only the valid data concentrated in the front part.

In this case, similarly, it shall be also evident that the V_sync2 signal for the $(k+1)^{th}$ frame, inputted during the present processing of the $k^{th}$ frame, can be skipped, and the data input and process in accordance with the V_sync2 signal can be skipped.

Figure 15:
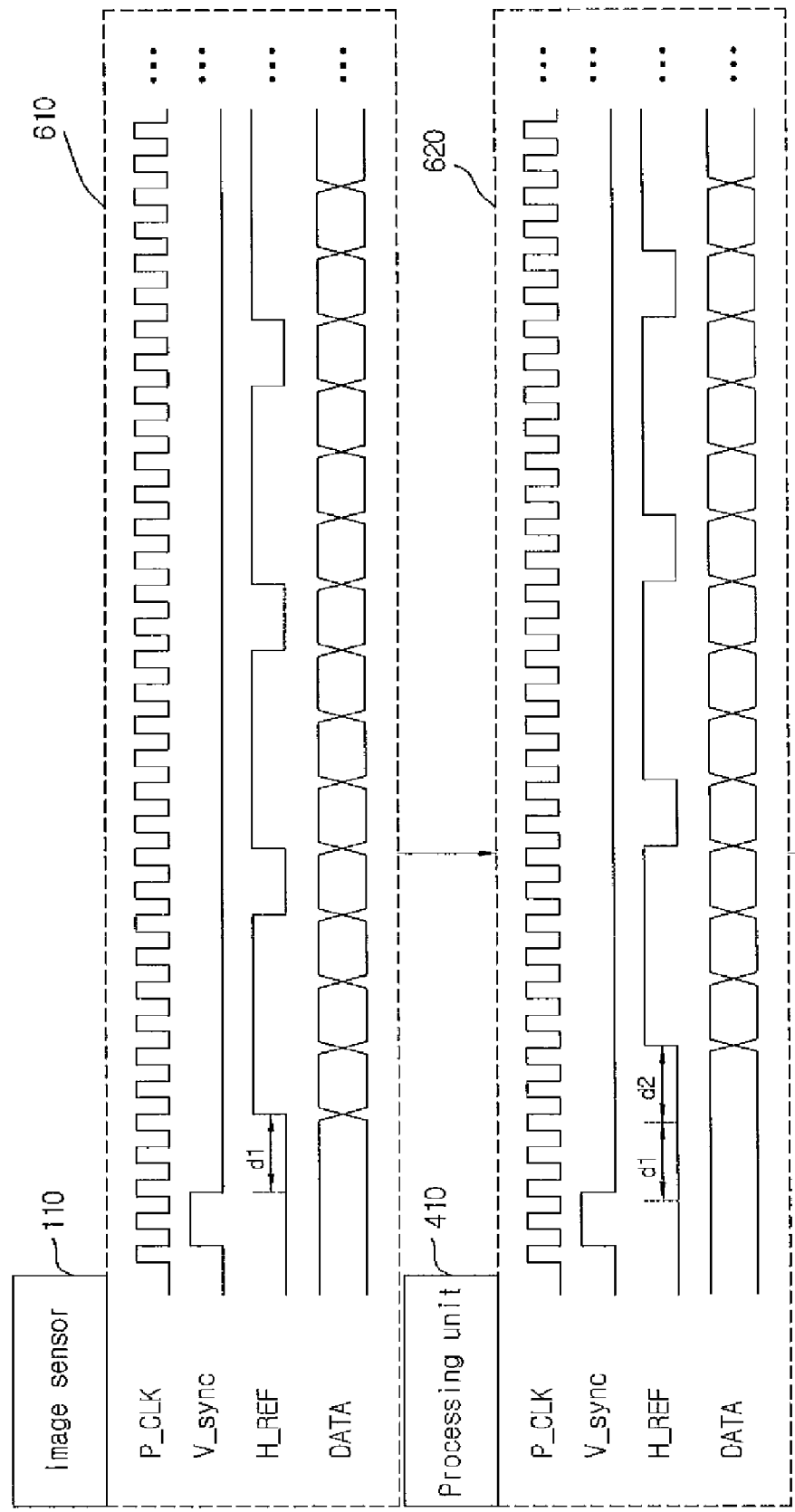
FIG. 15 and FIG. 16 show signal types for which the image signal processor outputs data processed by each element in accordance with another embodiment of the present invention.
Figure 16:
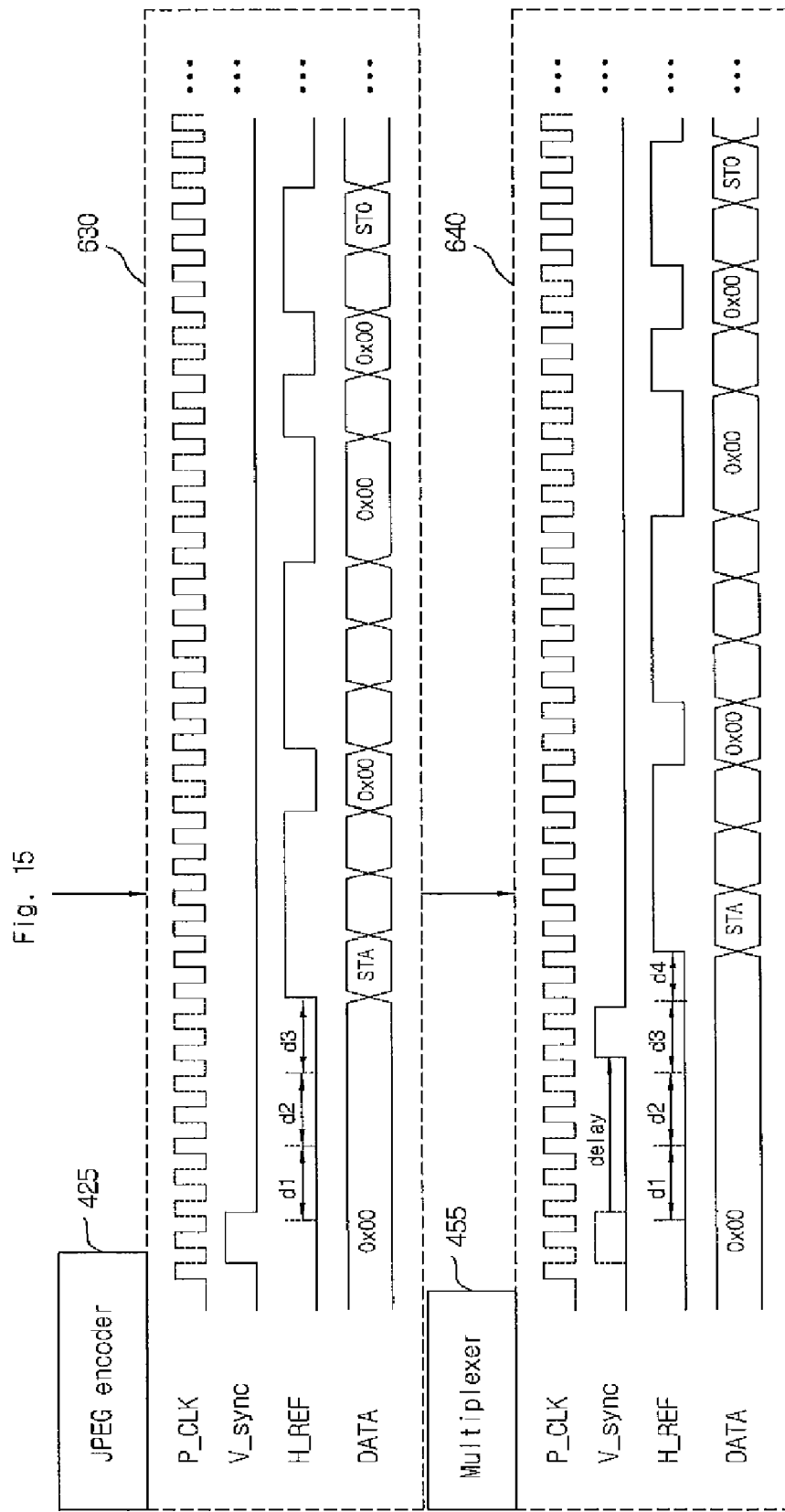

FIG. 15 and FIG. 16 show signal types for which the image signal processor outputs data processed by each element in accordance with another embodiment of the present invention As illustrated in FIG. 15 and in FIG. 16, a V_sync signal inputted from each element is inputted to a following element with a minimum delay (or without delay). On the other hand, data inputted from a prior element is outputted with a delay (e.g. d1, d2, d3 and d4) in buffering and processing operations.

For example if the image signal processor 310 outputs the V_sync signal from a prior element to a receiving part through the multiplexer 455 at a point that the V_sync signal is inputted, the receiving part starts to receive the JPEG encoded data a time of d1+d2+d3+d4 after the point that that the V_sync signal is inputted.

Accordingly, in accordance with another embodiment of the present invention, a standby time of the receiving part can be minimized by allowing the JPEG encoder 425 to output the V_sync signal to the receiving part from an arbitrary point (e.g. a point that the JPEG encoder 425 buffers a line of 1 to 8 lines to start encoding) in a range of the delay time d4 for data buffering.

Figure 17:
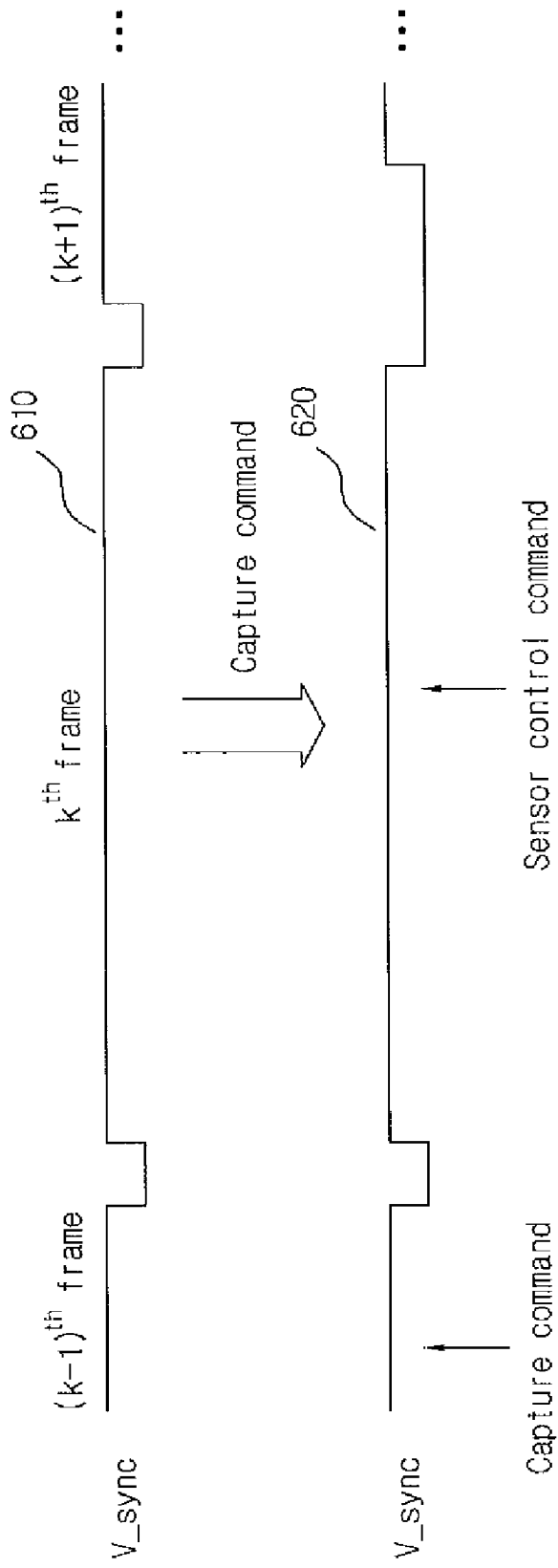
FIG. 17 and FIG. 18 show signal types for which the image signal processor outputs data processed by each element in accordance with yet another embodiment of the present invention.
Figure 18:
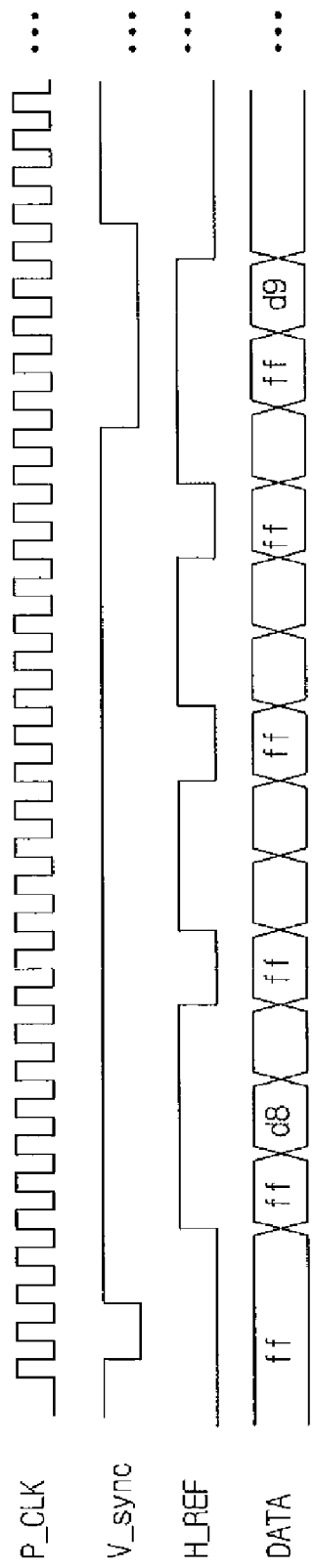

FIG. 17 and FIG. 18 show signal types for which the image signal processor 310 outputs data processed by each element in accordance with another embodiment of the present invention.

As illustrated in FIG. 17, once the image signal processor 310 receives a capture command in a preview state (e.g. the state in which the $(k-1)^{th}$ frame is inputted), the image signal processor 301 inputs a V_sync_extend command into the image sensor 110. The V_sync_extend command can be inputted through the sensor control unit 450. The V_sync_extend command can be transmitted during or directly before the process of the $k^{th}$ frame corresponding to the capture command.

The image sensor 110, which has received the V_sync_extend command, has an interval of time before inputting the V_sync signal into the image signal processor 310 such that the image signal processor 310 can process all data for the $k^{th}$ frame during the interval of time.

Assuming that the input of the V_sync signal is detected by a rising edge, as illustrated in FIG. 18, it can be set that the V_sync signal for the $(k+1)^{th}$ frame coincides with or is outputted following a point at which "STOP MARKER" for the $k^{th}$ frame is outputted.

As described above, the image signal processor 310 of the present invention can solve the problem of getting normal data processing interfered by the V_sync signal for the $(k+1)^{th}$ frame while the $k^{th}$ frame is processed, through the steps described above.

The conventional back-end chip 130 is embodied to receive the YUV/Bayer-format data, and the P_CLK, V_sync, H_REF and DATA signals, are used as the interface for receiving this kind of data.

Considering this, the image signal processor 310 of the present invention is realized to use the same interface as the conventional image signal processor.

Therefore, it shall be evident that the back-end chip 130 of the present invention can be port-matched although the back-end chip 130 is embodied trough the conventional method of designing back-end chip.

Hitherto, although the image signal processor 310 using the JPEG encoding method has been described, it shall be evident that the same data transmission method can be used for other encoding methods, such as the BMP encoding method, MPEG (MPEG 1/2/4 and MPEG-4 AVC) encoding and TV-out method.

As described above, the present invention can minimize a delay during image capturing by promptly encoding YUV data.

The present invention can also prevent conflict between data by restricting the input of the data for a following frame while encoding a frame.

Further, the present invention can have more data quickly transmitted in a data transmission section by maintaining a clock rate for encoding process of YUV data to be the same as or larger than a clock rate for outputting encoded image data.

Yet, with the present invention, the prompt transmission of valid data to the back-end chip can allow the back-end chip to quickly decode encoded data.

Still, the present invention can make the hardware design and control easier by using a general interface structure when the image signal processor provides encoded data to the back-end chip.

The present invention can improve the process efficiency and prevent the power consumption of the receiving part (e.g. the back-end chip or the baseband chip).

The present invention enables a smooth encoding operation by allowing the image signal processor to determine, in accordance with the encoding speed, whether the inputted frame is to be encoded.

With the present invention, the V_sync signal can be outputted at an optimized point when the data encoded by the encoder is transmitted to the receiving part.

The present invention can allow the input of data for processing a present frame not to be interfered by the input of the V_sync signal indicating that a new frame is inputted while encoded data is inputted in the receiving part.

Moreover, the present invention can improve the process efficiency and increase the process speed of the back-end chip by having encoded data including only valid data making up an image transmitted to the back-end chip.

Moreover, the present invention can prevent power consumption caused by switching of a write enable signal for a memory of the back-end chip by maintaining a H_REF signal, which can be used by the back-end chip when storing data, in a high state or a low state.

Furthermore, the present invention can increase the process efficiency and process speed of the back-end chip by having valid data forming an image concentrated in the front part of an outputting data column.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. An imaging device, comprising:
    an image sensor configured to generate and output raw data corresponding to an external image; and
    an image signal processor comprising an encoder and configured to generate and output to a receiving part YUV data corresponding to the raw data or data encoded by using the encoder,
    wherein a process clock rate is adjustable between a first process clock rate for generating the YUV data and a second process clock rate for generating the encoded data,
    an output clock rate for outputting the encoded data is adjustable, and
    the second process clock rate for generating the encoded data is larger than the first process clock rate for generating the YUV data.

2. The imaging device of claim 1, wherein the first process clock rate is the same as or smaller than the output clock rate for outputting the encoded data, and the second process clock rate is the same as or larger than the output clock rate.

3. The imaging device of claim 1, wherein a ratio of the first process clock rate to the second process clock rate is a ratio of a size of the YUV data corresponding to a frame to a size of data to be encoded.

4. The imaging device of claim 3, wherein the sizes comprise any one of the area, the width, the height and the diagonal length.

5. The imaging device of claim 1, wherein the image sensor generates and outputs the raw data to coincide with a clock signal inputted from the image signal processor corresponding to the first process clock rate and the second process clock rate.

6. The imaging device of claim 1, wherein the first process clock rate is a clock rate in a preview state, and the second process clock rate is a clock rate for processing a frame corresponding to a capture command inputted from the receiving part.

7. The imaging device of claim 6, wherein, while a $k^{th}$ frame corresponding to the capture command is processed, k being a natural number, in case that a vertical synchronous signal (V_sync) indicating that a $(k+1)^{th}$ frame is to start to be inputted is inputted from the image sensor, the image signal processor transmits a skip command to the image sensor, and the image sensor does not output raw data corresponding to the $(k+1)^{th}$ frame.

8. The imaging device of claim 6, wherein, while a $k^{th}$ frame corresponding to the capture command is processed, k being a natural number, in case that a vertical synchronous signal (V_sync) indicating that a $(k+1)^{th}$ frame is to start to be inputted is inputted from the image sensor, the image signal processor skips a process of the raw data being inputted from the image sensor.

9. The imaging device of claim 1, wherein the image signal processor comprises a buffer memory, temporarily storing to transmit the encoded data to the receiving part,
    wherein if the amount of encoded data, stored in the buffer memory, is the same as or larger than a predetermined size, the second clock rate is decreased.

10. The imaging device of claim 6, wherein the image sensor is instructed to allow the input of a $(k+1)^{th}$ frame to be delayed while a $k^{th}$ frame corresponding to the capture command is processed, k being a natural number.

11. An image signal processor, comprising:
    a clock generator configured to output a clock signal corresponding to a process clock rate;
    a control unit configured to control the clock generator to output a clock signal corresponding to an increased process clock rate if a capture command is inputted;
    a sub image signal processor (ISP) configured to generate YUV data by using raw data inputted from an image sensor in accordance with the clock signal;
    an encoding unit configured to generate encoded image data by using the YUV data in accordance with the clock signal;
    a memory configured to accumulate the encoded image data; and
    an output unit, by the control of the control unit, configure to output the accumulated encoded image data to a receiving part at every predetermined point,
    wherein the process clock rate is adjustable between a first process clock rate for generating the YUV data and a second process clock rate for generating the encoded image data, and
    an output clock rate for outputting the encoded image data is adjustable.

12. The image signal processor of claim 11, further comprising a buffer manager configured to monitor the amount of encoded image data accumulated in the memory and generate monitoring information,
    wherein the control unit increases or decreases the process clock rate by using the monitoring information.

13. The image signal processor of claim 11, wherein the output unit outputs the YUV data outputted by the sub ISP to the receiving part before the capture command is inputted.

14. The image signal processor of claim 11, wherein, while a $k^{th}$ frame corresponding to the capture command is processed, k being a natural number, in case that a vertical synchronous signal (V_sync) indicating that a $(k+1)^{th}$ frame is to start to be inputted is inputted from the image sensor, the control unit transmits a skip command to the image sensor, and the image sensor does not output raw data corresponding to the $(k+1)^{th}$ frame.

15. The image signal processor of claim 11, wherein, while a $k^{th}$ frame corresponding to the capture command is processed, k being a natural number, in case that a vertical synchronous signal (V_sync) indicating that a $(k+1)^{th}$ frame is to start to be inputted is inputted from the image sensor, the control unit transmits a skip command to the sub ISP, and the sub ISP skips the generation of YUV data corresponding to the $(k+1)^{th}$ frame.

16. The image signal processor of claim 11, wherein, while a $k^{th}$ frame corresponding to the capture command is processed, k being a natural number, the image sensor is instructed to allow the input of a $(k+1)^{th}$ frame to be delayed.

17. An image processing method, executed in an image signal processor of an imaging device comprising an image sensor, the image signal processor and a receiving part, the method comprising:
(a) generating YUV data corresponding to raw data inputted from the image sensor in accordance with a first process clock rate of a process clock rate, and outputting the YUV data to the receiving part in accordance with the first process clock rate;
(b) inputting a capture command from the receiving part; and
(c) generating encoded data corresponding to raw data inputted from the image sensor in accordance with a second process clock rate of the process clock rate that is larger than the first process clock rate, and outputting the encoded data to the receiving part in accordance with an output clock rate,
wherein the image signal processor comprises an encoder, the process clock rate is adjustable between the first process clock rate for generating the YUV data and the second process clock rate for generating the encoded data, and
an output clock rate for outputting the encoded data is adjustable.

18. The method of claim 17, wherein the image sensor generates and outputs the raw data to coincide with a clock signal from the image signal processor corresponding to the first process clock rate and the second process clock rate.

19. The method of claim 17, wherein the first process clock rate is a clock rate in a preview state, and the second process clock rate is a clock rate for processing a frame corresponding to a capture command inputted from the receiving part.

20. The method of claim 17, wherein the step (c) comprises:
generating encoded data corresponding to the raw data inputted from the image sensor in accordance with the second process clock rate;
storing the encoded data in a buffer memory; and
outputting the encoded data, stored in the buffer memory, to the receiving part in accordance with the second output clock rate at every predetermined point during a period coinciding with a predetermined condition,
wherein if the amount of the encoded data, stored in the buffer memory, is the same as or larger than a predetermined size, the second clock rate is decreased.

* * * * *